3,560,564
HYDROXYALKYLUREA PROCESS
Ludo K. Frevel and Jo Ann Gilpin, Midland, Mich., assignors to The Dow Chemical Company, Midland, Mich., a corporation of Delaware
No Drawing. Filed Oct. 14, 1968, Ser. No. 767,527
Int. Cl. C07c 127/00
U.S. Cl. 260—553                                5 Claims

ABSTRACT OF THE DISCLOSURE

In a process for making a hydroxyalkylurea by reacting urea with an alkanolamine at 100–170° C. and recycling reaction byproducts to the process, better overall yields are obtained when the byproduct fraction is reacted with ammonia at about the process temperature before recycling. Product quality is improved by operating under essentially anhydrous conditions and in the substantial absence of molecular oxygen.

BACKGROUND OF THE INVENTION

The present invention relates to an improvement in a known chemical process. It relates specifically to an improved process for making mono(hydroxyalkyl)ureas whereby better yields and higher product quality are obtained.

Hydroxyalkylureas such as 1 - (2 - hydroxyethyl)urea, 1-(2-hydroxybutyl)urea, and 1-(3-hydroxypropyl)urea are known compounds useful as modifiers and plasticizers for urea-formaldehyde resins. They are conveniently made by reacting urea with an appropriate alkanolamine at temperatures generally in the range 100–170° C. whereby ammonia is driven off and the resulting reaction mixture consists essentially of the desired product, small amounts of unreacted starting materials, and minor quantities of reaction byproducts such as disubstituted urea and compounds such as oxazolidinones formed by cyclizing side reactions. The reaction product is a viscous liquid, usually colored. The received alkylurea can be separated by conventional crystallization or selective solvent extraction methods whereby it is obtained as a pasty solid. Reaction byproducts and unreacted starting materials remain in the mother liquor or other residue of the separation.

In such preparations, it is known to recycle byproducts as well as unreacted starting materials to the process in order to improve efficiency in operation. For example, the disubstituted urea byproduct can react with urea under process conditions to form more of the desired monoalkylurea. However, the reaction is not complete and cyclic byproducts are not significantly reacted in a useful way so that continued recycle causes an undesirable build-up of byproducts, thereby necessitating periodic discard of considerable byproduct material as waste.

SUMMARY OF THE INVENTION

It has now been found that continued recycle of byproducts is made possible and a higher overall yield of monoalkylurea is obtained from the above-described preparatory process when at least a portion of the byproduct fraction is contacted with at least about an equal molar proportion of ammonia based on the byproducts at 100–200° C. under autogenous or higher pressure prior to recycle of that fraction to the process. Under these conditions, both the dialkylolurea and the cyclic oxazolidinone byproducts are converted to either the desired monoalkylol urea or to the starting urea and alkanolamine. By carrying out the steps of the process, i.e., the urea-alkanolamine reaction, the product separation, and the ammonia-byproduct reaction all under essentially anhydrous conditions and out of contact with molecular oxygen, crude monoalkylolurea of improved purity and color is obtained.

DETAILED DESCRIPTION

The urea-alkanolamine reaction is preferably run using about equal molar proportions of the two reactants. A higher proportion of urea decreases dialkylolurea production, but the final reaction mixture then contains an increasing proportion of unreacted urea which complicates product separation procedures. Correspondingly, a higher proportion of alkanolamine raises dialkylolurea product to an increasingly disadvantageous extent. The reaction is preferably carried out at 110–160° C. An inert solvent medium can be employed but this is not usually of any advantage.

Alkanolamines such as ethanolamine, isopropanolamine, 3-amino-1-propanol, 2-amino-1-butanol, and 2-amino-2-methyl-1-propanol can be used in the reaction with urea to obtain corresponding alkylolurea products. Ethanolamine and isopropanolamine are preferred alkanolamine reactants which produce 1-(2-hydroxyethyl)urea and 1-(2-hydroxypropyl)urea respectively.

The treatment of the byproduct fraction with ammonia is preferably accomplished using an excess of ammonia over the total byproducts, i.e., dialkylolurea plus the oxazolidinone. About 2–30 moles of ammonia per mole of byproducts is preferred and 2–15 moles of ammonia is most preferred. The preferable temperature for this step is in the range 125–175° C.

The autogenous pressure of the system is preferred for the ammonia-byproduct reaction. Higher pressures can be employed if desired. An inert solvent can be employed but is usually not desirable.

Ammonia treatment of the byproduct fraction or portion thereof can be carried out on each such recycle or at intervals, for example, on each second or third recycle depending upon the concentration and quantity of byproducts which accumulate according to the conditions of the process.

EXAMPLE 1

A mixture of 128.5 g. of ethanolamine and 126.8 g. of urea was heated at 115° C. with stirring in a reaction flask equipped with thermometer, reflux condenser, and stirrer while the reaction system was maintained under a slight pressure of argon. After 3.25 hours at 115° C., evolution of ammonia had substantially ceased. The white pasty reaction product was then recrystallized from 400 ml. of dry pyridine and the separated crystals of 1-(2-hydroxyethyl)urea were washed with petroleum ether to obtain a yield of 146.6 g. of white crystals, M.P. 89–93° C. All operations were carried out under a blanket of dry nitrogen or argon.

Surprisingly, when the product is recrystallized from solvents other than pyridine such as ethanol or even the homolog, picoline, a relatively impure product of low melting point is obtained. Pyridine appears to be unique as a crystallizing solvent in its capacity to provide a good yield of pure white 1-(2-hydroxyethyl)urea.

When the above experiment is repeated with no attempt to exclude air or traces of moisture, the crude product has a lower melting point and is yellowish in color.

EXAMPLE 2

The pyridine filtrate from the recrystallization of Example 1 was heated at 50° C. under reduced pressure to remove most of the solvent. The residue, amounting to 86 g., was combined with 89.2 g. of urea and 90.3 g. of ethanolamine and the mixture was heated as before for 3.25 hours at 115° C. Recrystallization of the reaction product from 385 ml. of pyridine and washing of the filtered crystals with petroleum ether yielded 122.1 g. of white, crystalline 1-(2-hydroxyethyl)urea, M.P. 87–92° C. As in Example 1, these operations were carried out under a blanket of dry argon or nitrogen.

EXAMPLE 3

The bulk of the pyridine was volatilized from the pyridine mother liquor from Example 2 as previously described to obtain a very viscous residue, weight 95.9 g.

Portions of about 30 g. of this residue were sealed in glass ampoules with about an equal weight of liquid ammonia and these were heated in a rocking autoclave at 150° C. for 2 hours. The ampoules were then cooled, opened under an argon blanket and the excess ammonia was allowed to vaporize. A total of 66.1 g. of residue was obtained from an original 62.1 g. of starting material.

EXAMPLE 4

The product of Example 3 (60.6 g.) was mixed with 47.8 g. of urea and 57.3 g. of ethanolamine and heated at 115° C. for 3.25 hours as before. A slight excess of ethanolamine was employed since the product from Example 3 had been found to contain excess urea. The 1-(2-hydroxyethyl)urea product was separated and washed as in Examples 1 and 2 to obtain 85.5 g. of white crystals, M.P. 87–91° C. The analyses of the reaction mixtures and the yields of hydroxyethylurea obtained in Examples 1–4 are summarized in the following table. Analysis figures are in weight percent.

TABLE 1

|  | Example | | | |
|---|---|---|---|---|
|  | 1 | 2 | 3 | 4 |
| Ethanolamine | <1.5 | <1.5 | 17.2 | 7 |
| Urea | 5 | 5 | 31.5 | 2 |
| 1-(2-hydroxyethyl)urea [1] | 84 | 71 | 38 | 78 |
| 2-oxazolidinone | 5 | 6 | | 5 |
| 1,3-bis(2-hydroxyethyl)urea | 6 | 10 | 7 | 6 |
| Pyridine | | 8 | 6.3 | 2 |
| Percent yield [2] | 66.8 | 54.0 | | 60.0 |
| Overall yield, percent [3] | 66.8 | 72.1 | | 82.0 |

[1] By difference.
[2] Of purified 1-(2-hydroxyethyl)urea, based on starting urea and overall total urea respectively.

EXAMPLES 5–6

Mixtures of 1,3-bis(2-hydroxyethyl)urea (BHEU) with excess ammonia were heated at 125° C. and 150° C. respectively in glass ampoules as described in Example 3. The reaction mixtures thereby obtained were analyzed to determine the degree of reaction and the identities of the products. The results are summarized in Table 2 with components of the reaction mixtures listed in weight percent.

TABLE 2

|  | Example | |
|---|---|---|
|  | 5 | 6 |
| NH₃/BHEU mole ratio | 2.2 | 10.1 |
| Temperature, ° C | 125 | 150 |
| Time, hours | 3 | 2 |
| Ethanolamine | 7 | 33 |
| Urea | Trace | 8 |
| 1-(2-hydroxyethyl)urea | 20–40 | [1] 44 |
| BHEU | Balance | 15 |

[1] By difference.

EXAMPLES 7–9

Using the procedure described in Examples 3, 5 and 6, mixtures of (1) urea and ethanolamine in equal molar proportions, (2) ammonia and 1-(2-hydroxyethyl)urea in 1.3:1 mole ratio, and (3) ammonia and 2-oxazoline in 1.8:1 mole ratio respectively were heated in glass ampoules at 125–130° C. for 2.5–3 hours and the resulting reaction mixtures were analyzed. The three mixtures were found to have essentially the same composition, each containing about 8 percent by weight of urea, 10–15 percent of ethanolamine, about 8 percent of 1,3-bis(2-hydroxyethyl)urea, and the balance of 70–75 percent 1-(2-hydroxyethyl)urea.

We claim:

1. In a process for the production of a mono(hydroxyloweralkyl)urea wherein urea and a lower monoalkanolamine are reacted in the liquid phase at about 100–170° C., the resulting reaction mixture is separated into a mono(hydroxyloweralkyl)urea fraction and a fraction containing byproducts of the reaction, and at least a portion of said byproduct fraction is recycled to the process, the improvement wherein said portion prior to recycling to the process is contacted with at least about one mole of ammonia per mole of byproduct at 100–200° C. under at least the autogenous pressure of the ammonia-byproduct mixture.

2. The process of claim 1 wherein the monoalkanolamine is ethanolamine and the hydroxyalkylurea product is 1-(2-hydroxyethyl)urea.

3. The process of claim 1 wherein the byproduct fraction is contacted with 2–30 moles of ammonia per mole of total byproducts.

4. The process of claim 2 wherein the steps of said process are carried out under essentially anhydrous conditions and in the substantial absence of molecular oxygen.

5. The process of claim 2 wherein the 1-(2-hydroxyethyl)urea is purified by crystallization from pyridine.

References Cited

UNITED STATES PATENTS 2,253,528    8/1941    Olin _____ 260—553

BERNARD HELFIN, Primary Examiner

M. W. GLYNN, Assistant Examiner